United States Patent
Kanevsky et al.

(10) Patent No.: US 6,584,425 B2
(45) Date of Patent: Jun. 24, 2003

(54) SMART THERMOMETER

(75) Inventors: Dimitri Kanevsky, Ossining, NY (US); Mariusz Sabath, Scarsdale, NY (US); Jan Sedivy, Prague (CZ); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/748,830

(22) Filed: Dec. 27, 2000

(65) Prior Publication Data

US 2002/0082798 A1 Jun. 27, 2002

(51) Int. Cl.$^7$ .............................................. G01K 17/00
(52) U.S. Cl. ......................... 702/131; 702/130; 702/187
(58) Field of Search ................................ 702/1, 3, 127, 702/130, 131, 182, 186–188; 455/412, 414, 456; 340/539, 627

(56) References Cited

U.S. PATENT DOCUMENTS

| 5,848,378 A | * 12/1998 | Shelton et al. .................. 702/3 |
| 6,288,646 B1 | * 9/2001 | Skardon ...................... 340/627 |
| 6,405,034 B1 | * 6/2002 | Tijerino ....................... 455/414 |

\* cited by examiner

Primary Examiner—Bryan Bui
(74) Attorney, Agent, or Firm—Ohlandt, Greeley, Ruggiero & Perle, L.L.P.; Daniel P. Morris

(57) ABSTRACT

A smart thermometer distributed system comprising a thermometer with a screen that allows one to enter a variety of data for the thermometer. The thermometer is connected to a computer and to a network and can retrieve from a history data base information about family members, including their dress, names, ages, previous illnesses and other information.

The smart thermometer system thus provides the user with specific weather information, and will enable him or her to choose appropriate dress for family members given their ages, previous illnesses and other information.

10 Claims, 5 Drawing Sheets

LOCAL DB OF FAMILY MEMBERS — 104

| LIST OF NAMES | AGE | AVAILABLE CLOTHES | MEDICAL HISTORY | HEALTH CONDITIONS RELATED TO WEATHER |
|---|---|---|---|---|
| NAME 1 | AGE 1 | ~~~ | ~~~ | ~~~ |
| NAME 2 | AGE 2 | ~~~ | ~~~ | ~~~ |
| NAME 3 | AGE 3 | ~~~ | ~~~ | ~~~ |
| ... | ... | ... | ... | ... |

FIG. 2

SMART THERMOMETER

FIELD OF THE INVENTION

This invention relates to a specially designed thermometer capable of providing the user with easily obtainable, complete weather information.

BACKGROUND OF THE INVENTION

In the modem age, weather controls all, but it does not always affect people if they are well informed. Ways to become informed about weather could be through the Internet, radio, television, almost any form of media. These methods of checking the weather are not always accurate. Even more so, almost all forms of checking weather are inaccurate. For example weather reports through media can often be reported with exaggerations. Even weather thermometers can be inaccurate. If a thermometer was located outside a house in an open area the sun could have a very great influence on the thermometer's readings.

Also another common problem with thermometers is that they give minimal information. For example, if a storm was heading towards a person's area they would only be able to know about it through media. Although, even media does not give the best information, because it does not inform how to dress and it cannot tell what kind of weather a person might experience in their exact location. Also, for travel it might be helpful to be able to know what to dress and what to pack.

SUMMARY OF THE INVENTION

Accordingly, a primary object of the present invention is to provide a full range of information, particularly about significant changes in weather, such as on-coming storms and about possible changes in clothing to be worn in view of the predicted weather changes.

The primary purpose, therefore, of this invention is to be able to create a universal thermometer that can provide ultimate information for weather and be able to give personal advice so that one can protect himself against weather.

A common problem presented with dressing for weather is with small children. It Is very hard to tell what they should wear for the weather outside. The inventive thermometer will be able to tell what precautions a person should take to be protected from the weather.

This thermometer will be connected to the Internet which is connected to a special database which lists a families clothing, age, personal information on their health, and any other necessary information. The thermometer will give advice on what to wear, what to do, and what to expect for every person of the family. Another important feature the thermometer will have is a calendar advisor. This function allows the thermometer to warn people about their scheduled events if hazardous weather may be approaching their area. This can be done by having a user fill in their weekly or monthly schedule into an Internet server. The information inputted into the server would be sent to the thermometer which would then apply it to its existing data of the upcoming weather.

Briefly stated, the broad aspect of this invention is a smart thermometer distributed system comprising a thermometer having a screen; input means for the thermometer; a network to which the thermometer is connected; and a computer to which the thermometer is connected, and wherein the computer has a history data base of the family members, dress, names, age, previous illnesses and other information.

A specific feature involves the connection of the thermometer to a server which reports the weather of exact locations through special thermometers. If the thermometer knows that the user checks the thermometer every morning before he/she goes to work, the thermometer may check the weather around the house and the place of the user's work. If it predicts rain, it will recommend to bring an umbrella.

Additional application for thermometers that are connected to a network involves an arrangement wherein data collection from thermometers can be done by a weather central server. This data collection can help to predict weather. Also, if the data collection is done from thermometers located in rooms, this data can be used to better regulate air conditioning.

The foregoing and still further objects and advantages of the present invention will be more apparent from the following detailed explanation of the preferred embodiments of the invention in connection with the accompanying drawings:

BRIEF DESCRIPTION OF THE DRAWINGS

FIG. 2—shows the database of clothing for the family members.

DESCRIPTION OF THE PREFERRED EMBODIMENT

Figure 1:
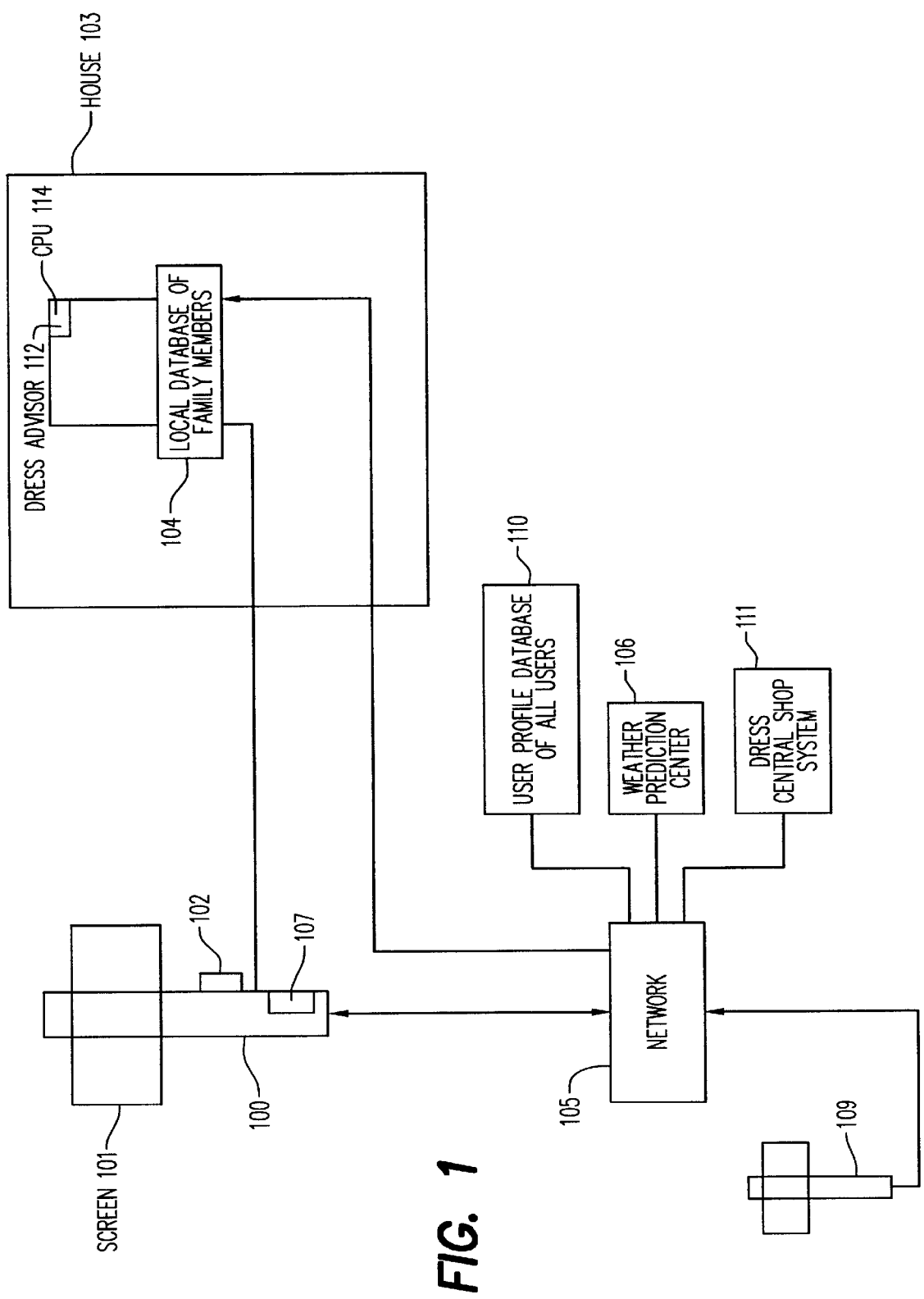
FIG. 1—is a block diagram of the smart thermometer distributed system.

Referring now to FIG. 1, there is seen a block diagram depicting the essential scheme of the smart thermometer distributed system. The thermometer is shown by number 100, the thermometer having a screen 101 where all necessary information can be shown. 102 represents the input device which allows the user to input the information he would like to be shown. This input device could be inputted through a speech recognition device. Device 107 enables biometrically determining who is checking the thermometer. Thermometer 100 is connected to a network 105. The thermometer is also connected within the house 103 to the home computer 104. The computer 104 has a history database of the family members dress, names, age, previous illnesses, and any other necessary information. A CPU 114 is located in the computer 104. The CPU 108 is responsible for inputting data of family members and inputting information about the weather. The network 105 is connected to the weather prediction center 106 which helps predict weather and sends data to the thermometer. The smart thermometer 102 is connected to other smart thermometers, for example, 109. This other smart thermometer is located at the place of work of a user. This is useful in being cautious about weather changes.

Block 110 represents the user's profiles data base, which is connected to the network 105. Element 112 represents the dress advisor which is running in the CPU 114; it advises what clothes should be worn depending on the temperature and the weather. 111 represents the dress central shop system. This is responsible for recommending clothes that the user may not own, but that may be needed for the user's health.

Referring now to FIG. 2, the database of clothing for the family members is seen. Column 201 represents the general data base of dress for the whole family. Column 202 lists the names of the family members. Column 203 lists the ages of the family members. Column 204 lists all the available dress items for the family members to wear. Column 205 shows what previous illnesses family members have had. Column 206 lists the weather conditions that were taking place during the time when the illness occurred and also what the person was wearing at the time.

Figure 3:
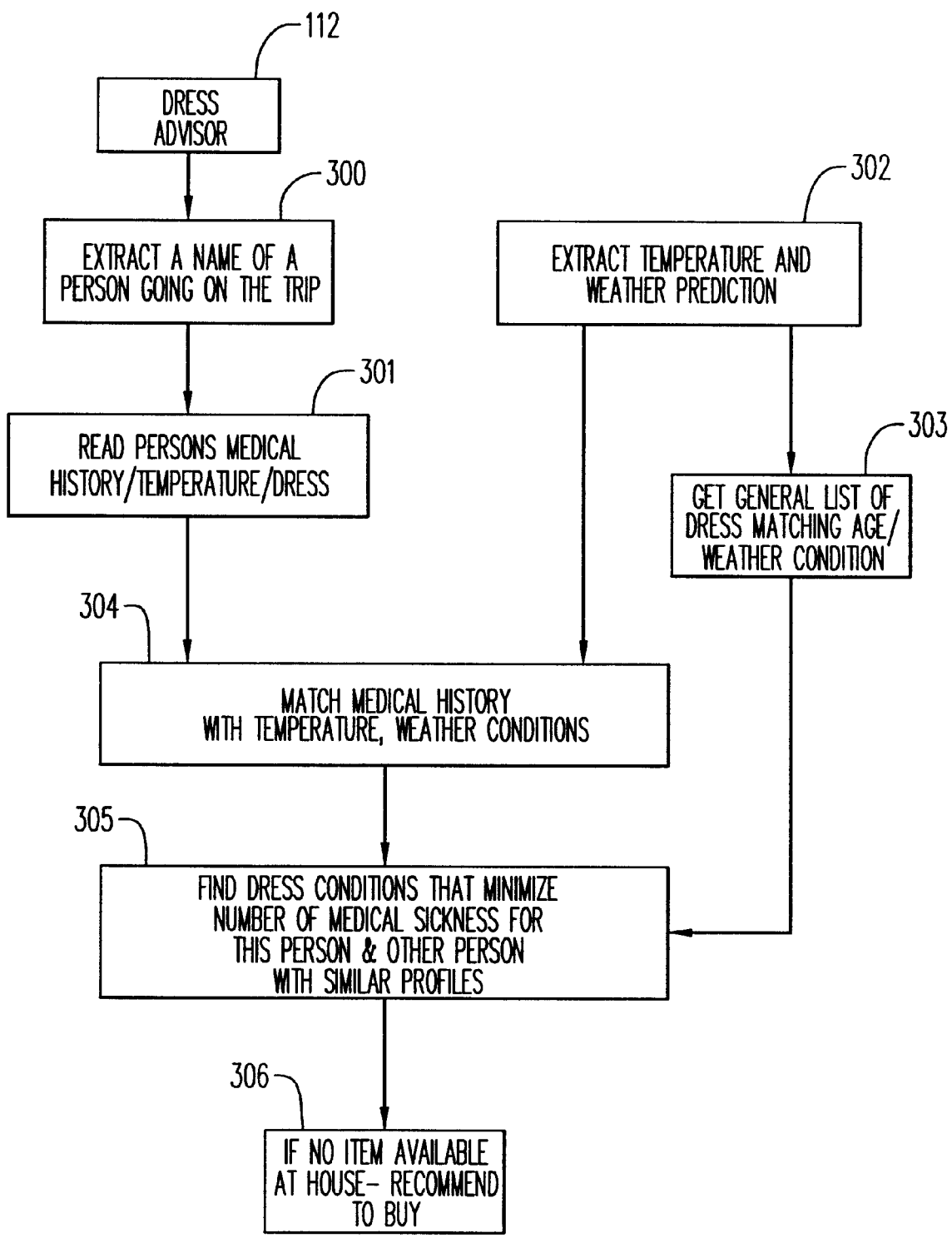
FIG. 3—explains by a flow chart the program that will be responsible for giving recommendations.

FIG. 3 explains the program that will be responsible for giving recommendations. 300 extracts the name of a person who might be going on a trip. 301 reads his/her medical history. 302 extracts temperatures and weather predictions. 304 matches medical history with temperature and weather predictions. 305 finds a form of dress that would minimize a medical sickness for this person and a person with a similar profile. 303 gets a general list of dress that matches with the age and weather conditions. 306 shows what items need to be bought if the item needed is not available.

Figure 4:
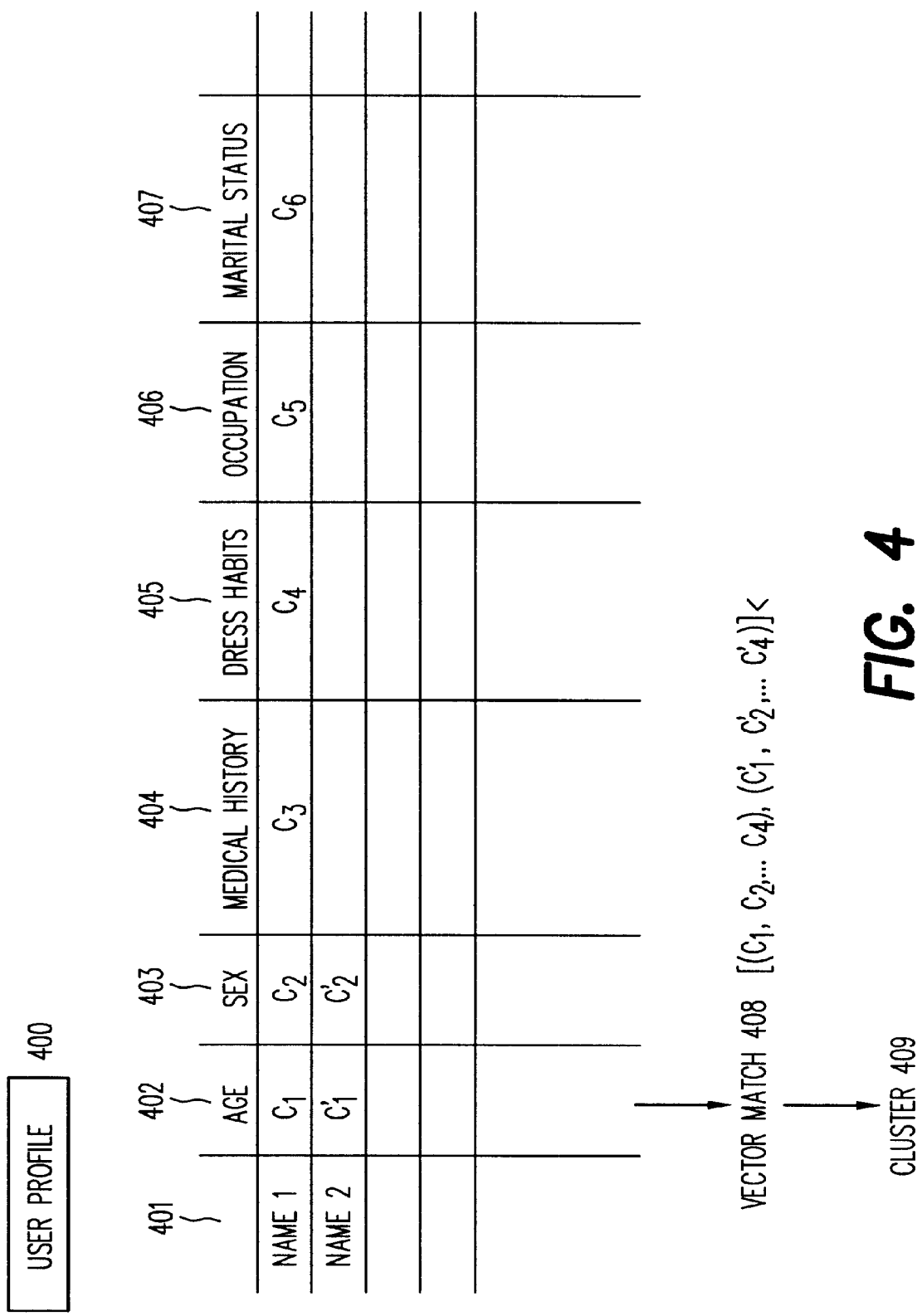
FIG. 4—shows the user profiles that are held in 110.

FIG. 4 shows the user profiles that are held in 110. Block 400 represents the Users Profile. 401 lists the names of the users. 402 shows the ages of the users. 403 shows the sex of the users. 404 lists all medical history on the users. 405 lists the dress habits of all the users. 406 lists the occupations of the users. 407 lists the marital status of the users. All of this information is listed as a certain number. For example, age could be represented as C1. 408 represents a vector match that is conducted. If the users are matched up together and have similar profiles, they are put in the same cluster 409.

Figure 5:
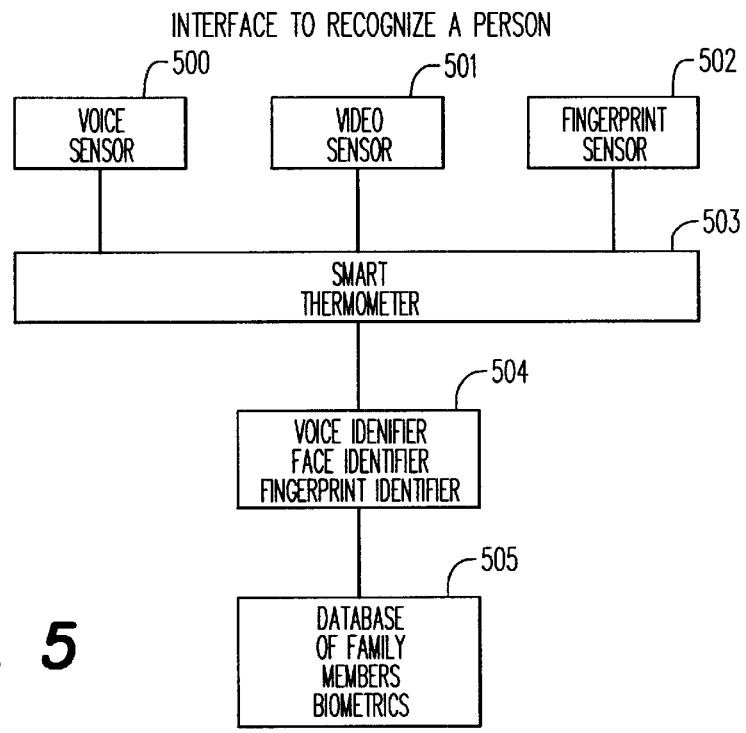
FIG. 5—explains how the thermometer understands who is checking the temperature on the thermometer.

FIG. 5 explains how the thermometer understands who is checking the temperature on the thermometer. The thermometer has a voice sensor 500, such as a microphone. The user speaks into the microphone to tell it the weather. The thermometer identifies the family members through 505 where all the biometrics of the family are stored. The thermometer compares the voice it hears to the voice prototype stored in the home computer 104. This system can work even better if used with a video sensor that consists of a video camera 501. This works by using 505 to find prototypes of family member's images. 502 is a finger print scanner which reads the fingerprints of family members when they are making a selection. This is also done by using 505 and prototypes of family member's fingerprints. 504 consists of the voice, face, and fingerprint identifiers. All of this is contained within the Smart Thermometer 503.

Figure 6:
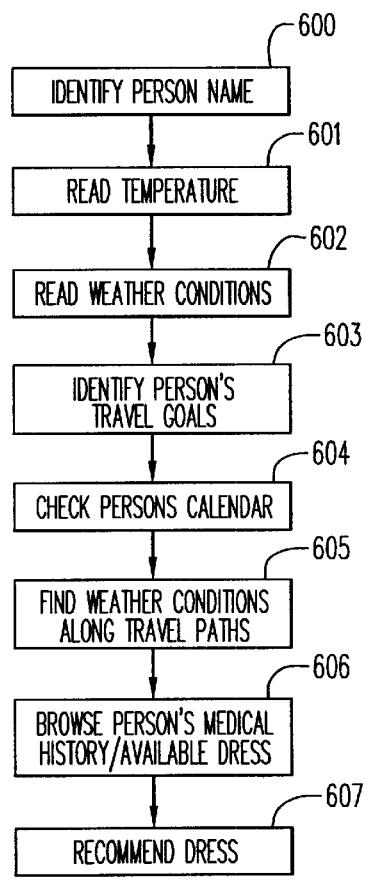
FIG. 6—is a flow chart of the method of the present invention.

FIG. 6 is a flow chart of the method. First, in accordance with step 600, the person's name is identified. 601 reads temperature. 602 reads weather conditions. 603 Identifies person's travel goals. 604 checks the person's calendar and scheduled dates. 605 finds weather conditions along travel paths. 606 browses person's medical histories and his/her available dress. 607 recommends dress.

The invention having been thus described with particular reference to the preferred forms thereof, it will be obvious that various changes and modifications may be made therein without departing from the spirit and scope of the invention as defined in the appended claims.

We claim:

1. A smart thermometer distributed system comprising:
   a) a thermometer having a screen;
   b) input means for the thermometer;
   c) a network to which the thermometer is connected; and
   d) a computer to which the thermometer is connected, wherein the computer has a history data base of the family members, including their dress, names, age, previous illnesses and other information.

2. A system as defined in claim 1, further comprising a CPU located in the computer for inputting the data of family members and information about the weather.

3. A system as defined in claim 2 further comprising a weather prediction center, the network being connected to the center such that the center helps predict the weather and sends data to the thermometer.

4. A system as defined in claim 1 further including initial smart thermometers and other locations such that the user can gain information about the weather and the other location.

5. A system as defined in claim 4 in which the input data is inputted through speech recognition, keyboard, handwriting recognition means.

6. A system as defined in claim 1, further including sensor means and biometric recognition means in the form of voice imprint or face recognition devices to determine who is checking the thermometer in the system.

7. A system as defined in claim 1 further including a database of clothing for family members and means for retrieving based on the family member's previous history and characteristics such as age.

8. A system as defined in claim 7 further including weather predictions for each specific country expected to be visited by a family member and means for inputting the name of the member who will be going on a trip, means for matching that person's medical history with temperature and weather predictions for the trip, and means for retrieving a form of dress from the database that would avert medical sickness of the person.

9. A process for providing information about the weather, and specifically about temperature, so that a person can protect himself against harmful conditions comprising the steps of:
   a) inputting data to a computer about a variety of persons, such as family members relating to their medical history, to which a thermometer having a screen is connected;
   b) inputting data to the computer relating to weather conditions at a given place and time and to the different dress available for the given person suitable for the conditions; and
   c) displaying on a screen a recommendation for the dress to be worn by the given person.

10. A process as defined in claim 9, further comprising:
    a) identifying a person's travel goals;
    b) checking the person's itinerary; and
    c) recommending dress by displaying on the screen the different selections based on the different weather conditions on the itinerary.

* * * * *